UNITED STATES PATENT OFFICE 2,461,156

IMIDAZOLINES AND PROCESS OF MAKING SAME

Max Hartmann, Riehen, and Hans Isler, Bottmingen, Switzerland, assignors to Ciba Pharmaceutical Products, Inc., Summit, N. J.

No Drawing. Application October 28, 1946, Serial No. 706,089. In Switzerland November 2, 1945

6 Claims. (Cl. 260—309.6)

The present invention relates to new 2,2'-diphenylene-bisimidazolines.

It has been found that these new compounds, and particularly the 2,2'-[diphenylene-(4,4')]-bis-imidazoline, possess a good trypanocidal activity on parenteral and peroral application. In addition, the toxicity of the aforesaid new compounds, especially on peroral administration, is slight.

The new imidazolines may be obtained by reacting diphenyldicarboxylic acids or their functional derivatives with alkylene-diamines, the amino groups of which are attached to vicinal carbon atoms. In particular, presently preferred starting compounds are diphenyl-4,4'-dicarboxylic acids and their functional derivatives. Diphenyldicarboxylic acid derivatives which may be used comprise, for example, their nitriles, imino ethers, amides, thioamides, iminothio ethers, halides, iminohalides, esters or amidines.

Instead of using the acid derivatives themselves as the starting materials, the process may be carried out under conditions such that they are formed in the course of the reaction. Thus instead of the thioamide, it is also possible to use the corresponding nitrile in the presence of hydrogen sulfide. It is further possible to produce the hydrogen sulfide during the course of the reaction from hydrogen sulfide-yielding materials such as carbon disulfide, phosphorus pentasulfide, alkali metal sulfides, ammonium sulfides, iron sulfide or aluminum sulfide, if necessary in the presence of small amounts of water.

Reactant alkylene-diamines, the amino groups of which are attached to vicinal carbon atoms, comprise, for example, ethylene-1,2-diamine, propylene-1,2-diamine and butylene-2,3-diamine. These diamines also may be prepared during the course of the reaction from the corresponding derivatives.

According to the reaction components employed, the conversion may be carried out in the presence or absence of water or organic diluents and/or condensation agents and catalysts. Also, one reactant, for example the alkylene-1,2-diamine, may be used in excess.

The end products obtained according to the process are employed as therapeutic agents or as intermediate products.

The invention is described more specifically in the following examples wherein the same relation exists between parts by weight and parts by volume as between grams and cubic centimeters.

Example 1

189 parts by weight of 95% ethylene-1,2-diamine and 369 parts by weight of diphenyl 4,4'-dicarboxylic acid iminoethyl ether dihydrochloride (M. P. 352–354° C.; prepared by permitting a chloroform-ethanol suspension of diphenyl-4,4'-dicarboxylic acid nitrile saturated at 0° C. with dry hydrogen chloride gas to stand for 1 to 2 days) are heated some time with stirring under reflux with 6,000 parts by volume of absolute ethanol. When ammonia is no longer evolved, the ethanol is distilled off, the residue treated with about 4,000 parts by volume of 2 normal hydrochloric acid, heated to boiling with the addition of some animal charcoal and filtered hot. From the clear solution, there is obtained on cooling 313 parts by weight of 2,2'-[diphenylene-(4,4')]-bis-imidazoline dihydrochloride of the formula

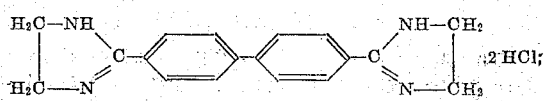

this corresponds to a yield of 86% of theoretical. It forms white crystals with a melting point above 360° C.

Instead of using diphenyl-4,4'-dicarboxylic acid imino ethyl ether dihydrochloride, there may be used also diphenyl-4,4'-dicarboxylic acid imino ethyl thioether dihydrochloride, or diphenyl-4,4'-dicarboxylic acid imino chloride which are obtained according to known methods.

Example 2

A mixture of 242 parts by weight of diphenyl-4,4'-dicarboxylic acid, 189 parts by weight of 95% ethylene-1,2-diamine and 300 parts by volume of concentrated hydrochloric acid (36.5% by volume) is heated in a stream of nitrogen gas slowly to an oil bath temperature of 270° C. and maintained at this temperature for 2 to 3 hours. After cooling, it is dissolved hot in 2 normal hydrochloric acid, treated a short time with a little animal charcoal and filtered. From the clear filtrate, there crystallizes 2,2'-[diphenylene-(4,4')]-bis-imidazoline dihydrochloride. Yield 302 parts by weight corresponding to 83% of theory.

In this procedure, diphenyl-4,4'-dicarboxylic acid may be replaced by its disodium salt in which case instead of ethylene-1,2-diamine and hydrochloric acid, ethylene-1,2-diamine dihydrochloride is employed.

Instead of 95% ethylene-1,2-diamine, a dilute aqueous solution also may be used. Besides, it is possible to work in the absence of hydrochloric acid, if necessary with the further addition of ethylene diamine.

Moreover, it is possible in the above example to replace the free diphenyl-4,4'-dicarboxylic acid by an ester or an amide.

Example 3

To 204 parts by weight of diphenyl-4,4'-dicarboxylic acid nitric, 139 parts by weight of 95% ethylene diamine and 4,000 parts by volume of absolute ethanol, there are added while cooling with ice 80 parts by weight of dry hydrogen chloride gas and the mixture is afterwards saturated at the same temperature with hydrogen sulfide. Hereupon the mixture is heated in a closed vessel very slowly to 90-95° C., maintained for two hours at this temperature, the ethanol distilled off, and the residue taken up in 2 normal hydrochloric acid, stirred with animal charcoal and filtered. From the clear solution, 2,2'-[diphenylene-(4,4')]-bis-imidazoline dihydrochloride crystallizes. It is suction filtered and dried.

In this reaction, the presence of hydrogen chloride is not absolutely essential.

Also, the ethylene diamine may be reacted with diphenyl-4,4'-dithiocarboxylic acid amide which is obtained from the nitrile through treatment with hydrogen sulfide according to known methods.

Example 4

238 parts by weight of diphenyl-4,4'-diamidine of M. P. 255-256° C., 189 parts by weight of 95% ethylene diamine and 6,000 parts by volume of absolute ethanol are heated under reflux for several hours. After cessation of ammonia evolution, the mixture is worked up according to Example 1. In this way, 2,2'-[diphenylene-(4,4')]-bis-imidazoline dihydrochloride is obtained in almost quantitative yields.

Example 5

To 189 parts by weight of 95% ethylene diamine, are added with stirring 279 parts by weight of diphenyl-4,4'-dicarboxylic acid chloride. Then it is heated in a stream of nitrogen slowly to an oil bath temperature for several hours. Hereupon one proceeds according to Example 2 and in this way obtains 2,2'-[diphenylene-(4,4')]-bis-imidazoline dihydrochloride.

Example 6

286 parts by weight of the sodium salt of diphenyl-4,4'-dicarboxylic acid and 294 parts by weight of propylene-1,2-diamine dihydrochloride are mixed thoroughly and heated slowly to an oil bath temperature of 270° C. The mixture is maintained for several hours at this temperature while stirring. When water is no longer evolved, the mixture is cooled, the crystalline melt pulverized, treated with 3,000 parts by volume of normal hydrochloric acid and brought into solution by warming, an acid reaction to Congo prevailing throughout. After heating briefly with animal charcoal, it is filtered and the filtrate evaporated to dryness at 12 mm. The dry residue is taken up in absolute ethanol, filtered free from salt and the filtrate strongly concentrated whereupon after cooling 2,2'-[diphenylene-(4,4')]-4,4'-(or 5,5')-dimethyl-bis-imidazoline dihydrochloride crystallizes out. It is a white crystalline powder of M. P. above 360° C. The free base melts after crystallization from xylene, at 277-278° C.

Example 7

286 parts by weight of the sodium salt of diphenyl-4,4'-dicarboxylic acid and 322 parts by weight of butylene-2,3-diamine dihydrochloride are heated for several hours at 270° C. Hereupon the cooled melt is dissolved in hot normal hydrochloric acid at a reaction acid to Congo. The solution is treated with animal charcoal, mixed with stirring at 2-5° C. with a small excess of normal sodium hydroxide, the precipitate sucked off immediately and dried over caustic alkali at 0.05 mm. 2,2'-[diphenylene-(4,4')]-4,5,4',5'-tetramethyl-bis-imidazoline, recrystallized from toluene, forms white crystals of M. P. 325-326° C. The white dihydrochloride melts above 360° C.

Having thus described the invention, what is claimed is:

1. A member selected from the group consisting of the 2,2'-diphenylene-bis-imidazolines which are unsubstituted in the imidazoline ring, the 2,2'-diphenylene-bis-imidazolines which are substituted by a lower alkyl group in the imidazoline ring, and the inorganic acid salts thereof.

2. The 2,2'-diphenylene-bis-imidazolines which are unsubstituted in the imidazoline ring.

3. The 2,2'-diphenylene-bis-imidazolines which are substituted by a lower alkyl group in the imidazoline ring.

4. 2,2'-[diphenylene-(4,4')] - bis - imidazoline, forming a dihydrochloride.

5. 2,2'-[diphenylene-4,4')]-4,4'-dimethyl - bis-imidazoline, forming a dihydrochloride.

6. 2,2' - [diphenylene - (4,4')] - 4,5,4',5'-tetramethyl-bis-imidazoline, forming a dihydrochloride.

MAX HARTMANN.
HANS ISLER.

REFERENCES CITED

The following references are of record in the file of this patent:

UNITED STATES PATENTS

| Number | Name | Date |
|---|---|---|
| 2,194,419 | Chwala | Mar. 19, 1940 |

FOREIGN PATENTS

| Number | Country | Date |
|---|---|---|
| 501,522 | Great Britain | Feb. 28, 1939 |

Certificate of Correction

February 8, 1949.

Patent No. 2,461,156.

MAX HARTMANN ET AL.

It is hereby certified that errors appear in the printed specification of the above numbered patent requiring correction as follows:

Column 1, line 2, for "bisimidazolines" read *bis-imidazolines*; column 3, line 10, Example 3, for "nitric" read *nitrile*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*